(12) United States Patent
Chen et al.

(10) Patent No.: US 10,166,636 B2
(45) Date of Patent: Jan. 1, 2019

(54) COMPOSITE HARD-SURFACE MATERIAL AND PREPARATION METHOD THEREFOR

(71) Applicant: SEED TECHNOLOGIES CORP., LTD., Hunan (CN)

(72) Inventors: Cankun Chen, Hunan (CN); Yuehua Xu, Hunan (CN); Zhihua Cao, Hunan (CN)

(73) Assignee: SEED TECHNOLOGIES CORP., LTD., Zhuzhou, Hunan (CN)

( * ) Notice: Subject to any disclaimer, the term of this patent is extended or adjusted under 35 U.S.C. 154(b) by 0 days.

(21) Appl. No.: 15/544,996

(22) PCT Filed: Dec. 11, 2015

(86) PCT No.: PCT/CN2015/097092
§ 371 (c)(1),
(2) Date: Jul. 20, 2017

(87) PCT Pub. No.: WO2017/084132
PCT Pub. Date: May 26, 2017

(65) Prior Publication Data
US 2017/0368645 A1    Dec. 28, 2017

(30) Foreign Application Priority Data
Nov. 20, 2015    (CN) .......................... 2015 1 0816202

(51) Int. Cl.
*B23K 35/30*    (2006.01)
*B23K 10/02*    (2006.01)
(Continued)

(52) U.S. Cl.
CPC .......... *B23K 35/3033* (2013.01); *B22F 5/006* (2013.01); *B22F 7/064* (2013.01);
(Continued)

(58) Field of Classification Search
CPC .... B23K 35/3033; B23K 35/30; B23K 10/02; B23K 11/11; B23K 35/327; B23K 35/023;
(Continued)

(56) References Cited

FOREIGN PATENT DOCUMENTS

| CN | 1433868 A | 8/2003 |
|---|---|---|
| CN | 101148008 A | 3/2008 |

(Continued)

OTHER PUBLICATIONS

State Intellectual Property Office of the P.R. China As the International Searching Authority, International Search Report for PCT application No. PCT/CN2015/097092, dated Aug. 9, 2016.

*Primary Examiner* — Jessee R Roe
(74) *Attorney, Agent, or Firm* — Honigman Miller Schwartz and Cohn LLP; Matthew H. Szalach; Jonathan P. O'Brien

(57) ABSTRACT

A composite hard-surface material preparation method and a composite hard-surface material prepared thereby, the preparation method comprising: dispersedly fixing a plurality of cemented carbide sheets (2) to a surface of a metal substrate (1); and surfacing the cemented carbide sheets (2) and the metal substrate (1) with a solder (3) to obtain a composite hard-surface material, the solder (3) comprising nickel-based alloy powder, tungsten carbide particles and boron nitride powder. The solder (3) used in the preparation of the composite hard-surface material comprises nickel-based alloy powder, tungsten carbide particles and boron nitride powder, wherein the nickel-based alloy powder can increase fluidity and corrosion resistance, the tungsten carbide particle can improve hardness, and the boron nitride powder can effectively reduce friction coefficient. The present solder has good fluidity, high hardness and good solder- (Continued)

ability, using said solder, the obtained composite hard-surface material may enjoy good wear resistance.

10 Claims, 2 Drawing Sheets

(51) Int. Cl.
<table>
<tr><td>B22F 5/00</td><td>(2006.01)</td></tr>
<tr><td>B23K 11/11</td><td>(2006.01)</td></tr>
<tr><td>C22C 19/03</td><td>(2006.01)</td></tr>
<tr><td>C22C 29/08</td><td>(2006.01)</td></tr>
<tr><td>C22C 29/16</td><td>(2006.01)</td></tr>
<tr><td>B22F 7/06</td><td>(2006.01)</td></tr>
<tr><td>B23K 35/32</td><td>(2006.01)</td></tr>
<tr><td>B23K 35/02</td><td>(2006.01)</td></tr>
</table>

(52) U.S. Cl.
CPC .............. *B23K 10/02* (2013.01); *B23K 11/11* (2013.01); *B23K 35/0233* (2013.01); *B23K 35/0244* (2013.01); *B23K 35/30* (2013.01); *B23K 35/327* (2013.01); *C22C 19/03* (2013.01); *C22C 29/08* (2013.01); *C22C 29/16* (2013.01)

(58) Field of Classification Search
CPC ........ B23K 35/024; B22F 5/006; B22F 7/064; C22C 29/08; C22C 29/016
See application file for complete search history.

(56) References Cited

FOREIGN PATENT DOCUMENTS

<table>
<tr><td>CN</td><td>202147448 U</td><td>2/2012</td></tr>
<tr><td>CN</td><td>102513647 A</td><td>6/2012</td></tr>
<tr><td>CN</td><td>103388145 A</td><td>11/2013</td></tr>
<tr><td>CN</td><td>104976200 A</td><td>10/2015</td></tr>
<tr><td>CN</td><td>104976201 A</td><td>10/2015</td></tr>
<tr><td>WO</td><td>WO-2014/091290 A1</td><td>6/2014</td></tr>
</table>

COMPOSITE HARD-SURFACE MATERIAL AND PREPARATION METHOD THEREFOR

The present application is a National Stage application of PCT international application PCT/CN2015/097092, filed on Dec. 11, 2015 which claims the priority of Chinese Patent Application No. 201510816202.8, filed with the Chinese Patent Office on Nov. 20, 2015 and entitled "Composite hard-face material and method for preparing the same", the entire disclosures of which are incorporated herein by reference.

FIELD OF THE INVENTION

The present invention relates to the technical field of hard-face material, and in particular to a composite hard-face material and a method for preparing the same.

BACKGROUND OF THE INVENTION

Hard-face technology is a metal surface reinforcement technology, and comprises thermal spraying, spray welding, overlay welding, and the like. The essence of hard-face technology lies in using composite material to prepare metal mechanical parts such that the metal mechanical parts have good abrasion resistance, corrosion resistance, and high-temperature resistance. A wide variety of products can be produced by hard-face technology, and can be widely used in iron and steel, aerospace, automobile, general machinery, energy, petrochemical, textile, paper-making and other industries.

In the existing hard-face technology, the hard-face material can be iron-based, nickel-based or tungsten carbide material, which can meet the requirements of general mechanical part surface for abrasion and corrosion resistance and impact resistance. However, for some extremely harsh working conditions or some parts that require high abrasion and corrosion resistance properties or the like, such as TC bearings, drilling tools, stabilizers, etc., they are often operated in a liquid medium that is high erosional, strong acidic, strong alkali or the like and are susceptive to erosion and abrasion, thus the above hard-face materials cannot satisfy their use requirements.

Composite hard-face materials exhibit high abrasion resistance and corrosion resistance, and can satisfy the use requirements of higher conditions. Methods for preparing composite hard-face material include both sintering and spray welding. However, the matrix of the composite hard-face material prepared by means of sintering has a decreased hardness due to a high sintering temperature, thus the resultant products are easy to deform during use, affecting the cooperated use between respective parts. For the composite hard-face material prepared by means of spray welding, the bonding between the hard face layer and the matrix is not strong enough due to a semi-metallurgical bonding, and the hard face layer tends to peel off from the products during use. Moreover, the material prepared by means of spray welding has 2% to 5% of microporosity, which will greatly reduce the abrasion resistance of the hard face layer. Therefore, there is an urgent need for a composite hard-face material having excellent abrasion resistance.

SUMMARY OF THE INVENTION

In view of the above, an object of the present invention is to provide a composite hard-face material and a method for preparing the same. The composite hard-face material prepared by the method provided according to the invention has good abrasion resistance.

The present invention provides a method for preparing a composite hard-face material, comprising:

dispersedly fixing a plurality of hard-alloy sheets on a surface of a metal matrix; and overlay welding the hard-alloy sheets and the metal matrix using a solder, to obtain the composite hard-face material, wherein the solder comprises nickel-based alloy powder, tungsten carbide particles, and boron nitride powder.

Preferably, a plurality of hard-alloy sheets are dispersedly fixed on the surface of a metal matrix by spot welding.

Preferably, dispersedly fixing the plurality of hard-alloy sheets on the surface of the metal matrix by spot welding comprises steps of:

(1) placing a metal mesh on the surface of the metal matrix;

(2) arranging a plurality of solder sheets on a surface of the metal mesh;

(3) placing the hard-alloy sheets on a surface of each of the solder sheets; and (4) subjecting the hard-alloy sheets and the metal matrix to spot welding, such that the plurality of hard-alloy sheets are dispersedly fixed on the surface of the metal matrix, wherein the spot welding has a current ranging from 700 A to 1000 A.

Preferably, arranging a plurality of solder sheets on a surface of the metal mesh comprises:

placing a mold on the surface of the metal mesh, wherein the mold has a plurality of holes which communicate with the surface of the metal mesh; and placing the solder sheets in each hole such that a plurality of solder sheets are arranged on the surface of the metal mesh.

Preferably, a mass ratio of the nickel-based alloy powder, the tungsten carbide particles and the boron nitride powder is (30-55):(45-70):(0.2-0.5).

Preferably, the overlay welding is plasma overlay welding.

Preferably, a welding current is 75 to 85 A and a welding voltage is 26 to 30V during the overlay welding.

Preferably, an ion gas flow rate is 1.3 L/min to 1.5 L/min and a powder feeding rate is 40 g/min to 50 g/min during the overlay welding.

Preferably, after subjecting the hard-alloy sheets and the metal matrix to spot welding, the method further comprises:

grinding the obtained overlay welding product to obtain the composite hard-face material, wherein the grinding is a grinding process using a resin bonded diamond grinding wheel.

In the method for preparing a composite hard-face material provided according to the present invention, a plurality of hard-alloy sheets are dispersedly arranged on the surface of the metal matrix, which allow the obtained composite hard-face material to exhibit good abrasion resistance. Moreover, the solder used during the process of preparing a composite hard-face material in the present invention comprises nickel-based alloy powder, tungsten carbide particles and boron nitride powder, wherein the nickel-based alloy powder can increase the flowability and corrosion resistance, the tungsten carbide particles can increase the hardness, and the boron nitride powder can effectively reduce the friction coefficient, thus this solder has good flowability, high hardness and good weldability, and the composite hard-face material prepared using this solder can further improve the abrasion resistance of the composite hard-face material prepared in the invention.

The invention provides a composite hard-face material prepared by the method according to the above technical solution described above, comprising:

a metal matrix; and a plurality of hard-alloy sheets dispersedly arranged on a surface of the metal matrix by overlay welding via a solder, wherein the solder comprises nickel-based alloy powder, tungsten carbide particles, and boron nitride powder.

The composite hard-face material provided according to the invention is the composite hard-face material prepared by the method according to the technical solution described above, wherein the composite hard-face material is dispersedly arranged with a plurality of hard-alloy sheets on the surface thereof; moreover, the solder comprises nickel-based alloy powder, tungsten carbide particles, and boron nitride powder, a hard face layer formed from the hard-alloy sheets and the solder allows the composite hard-face material to have good abrasion resistance.

BRIEF DESCRIPTION OF THE DRAWINGS

In order to more clearly illustrate the embodiments of the present invention or the technical solutions of the prior art, the drawings which are required in the description of the embodiments or the prior art will be briefly described below, and it will be apparent that the drawings in the following description are only examples of the present invention, and other drawings may be obtained by those skilled in the art in view of the provided drawings without creative effort.

DETAILED DESCRIPTION OF THE INVENTION

Figure 1:
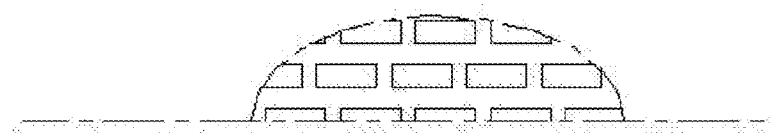
FIG. 1 is a schematic view showing the arrangement mode of rectangular hard-alloy sheets provided in an embodiment of the present invention.

The technical solutions in examples of the present invention will be clearly and completely described below. Obviously, the described examples are only a part of the embodiments of the present invention, rather than all of the embodiments. All other embodiments, obtained based on the embodiments of the present invention by those skilled in the art without creative work, will fall within the protection scope of the present invention.

The present invention provides a method for preparing a composite hard-face material, comprising:

dispersedly fixing a plurality of hard-alloy sheets on a surface of a metal matrix; and overlay welding the hard-alloy sheets and the metal matrix using a solder, to obtain the composite hard-face material, wherein the solder comprises nickel-based alloy powder, tungsten carbide particles, and boron nitride powder.

In the present invention, a plurality of hard-alloy sheets are dispersedly fixed on a surface of a metal matrix. In an embodiment of the present invention, the plurality of hard-alloy sheets are dispersedly fixed on the surface of the metal matrix by spot welding. In an embodiment of the present invention, dispersedly fixing the plurality of hard-alloy sheets on the surface of the metal matrix by spot welding comprises steps of:

(1) placing a metal mesh on the surface of the metal matrix;

(2) arranging a plurality of solder sheets on a surface of the metal mesh;

(3) placing the hard-alloy sheets on a surface of each of the solder sheets; and (4) subjecting the hard-alloy sheets and the metal matrix to spot welding, such that the plurality of hard-alloy sheets are dispersedly fixed on the surface of the metal matrix, wherein the spot welding has a current ranging from 700 A to 1000 A.

In an embodiment of the present invention, the metal matrix may be a steel matrix. In an embodiment of the present invention, the steel matrix may be an alloy steel or a carbon steel, such as medium carbon steel or low carbon steel. In an embodiment of the present invention, the steel matrix may be 42CrMo. In an embodiment of the present invention, the surface of the metal matrix may be one of circular surface, flat surface and inclined surface, or a combined surface of more of circular surface, flat surface and inclined surface, such as an outer circular surface, an inner bore surface, a flat surface, and an oblique angle surface. The shape and size of the metal matrix in the present invention are not particularly limited, as long as they satisfy the practical requirements for use. In an embodiment of the present invention, the shape of the steel base may be cylindrical.

In embodiments of the present invention, the metal mesh is a steel mesh. In embodiments of the present invention, a pore size of the metal mesh is 0.5 mm to 1.5 mm. In other embodiments, the pore size of the metal mesh is 0.8 mm to 1.2 mm. In yet other embodiments, the pore size of the metal mesh is 1 mm. In embodiments of the present invention, a thickness of the metal mesh is 0.1 mm to 0.3 mm. In other embodiments, the thickness of the metal mesh is 0.2 mm. In embodiments of the present invention, the shape of the metal mesh may conform to the surface shape of the metal matrix, or may be twisted with the surface shape of the metal matrix, as long as the metal mesh can completely cover the surface of the metal matrix. The source of the metal mesh in the present invention is not particularly limited, for example, 316L-type steel mesh provided by Shengbang Wire Mesh Factory, Anping County, Hebei Province may be used.

In an embodiment of the present invention, after placing the metal mesh on the surface of the metal matrix, a plurality of solder sheets are arranged on the surface of the metal mesh. In an embodiment of the present invention, arranging the plurality of solder sheets on the surface of the metal mesh comprises:

placing a mold on the surface of the metal mesh, wherein the mold has a plurality of holes which communicate with the surface of the metal mesh; and placing the solder sheets in each hole such that the plurality of solder sheets are arranged on the surface of the metal mesh.

In an embodiment of the present invention, a mold is disposed on the surface of the metal mesh. In an embodiment of the present invention, the mold has high temperature resistance and good flexibility, and can be bent with the surface shape of the metal matrix and conform to the surface shape of the metal matrix. In an embodiment of the present invention, the mold is made of asbestos paper. In embodiments of the present invention, a thickness of the mold is 1 mm to 2 mm. In other embodiments, the thickness of the mold is 1.2 mm to 1.8 mm. In yet other embodiments, the thickness of the mold is 1.4 mm to 1.6 mm.

In the present invention, the mold has a plurality of holes which communicate with the surface of the metal mesh. In the present invention, a plurality of solder sheets are arranged on the surface of the metal mesh by placing the solder sheets in the holes. In an embodiment of the present invention, the shape and size of the holes in the mold are in agreement with the shape and size of the hard-alloy sheets. In the present invention, by placing solder sheets in the holes of the mold and placing the hard-alloy sheets on the solder sheets, the hard-alloy sheets are allowed to be arranged on the metal mesh, thereby ensuring the hard-alloy sheets are finally dispersedly fixed on the surface of the metal matrix. In embodiments of the invention, the shape of the holes in the mold may be rectangular, circular, elliptical, or regular hexagonal. In embodiments of the invention, two adjacent rows of holes in the mold may have a malposition arrangement. In embodiments of the present invention, a distance between two adjacent rows of holes in the mold is 2 mm to 3.5 mm, and a distance between two adjacent holes in each row is 1 mm to 2 mm.

In an embodiment of the present invention, the solder sheet has a moderate melting point and good wetting properties for both the hard-alloy sheet and the metal mesh. In embodiments of the present invention, the solder sheet has a melting point of 900° C. to 1100° C. In other embodiments, the solder sheet has a melting point of 950° C. to 1050° C. In yet other embodiments, the solder sheet has a melting point of 980° C. to 1020° C. In an embodiment of the present invention, the solder sheet is red copper sheet. In embodiments of the present invention, the solder sheet has a thickness of 0.05 mm to 0.15 mm. In other embodiments, the solder sheet has a thickness of 0.08 mm to 0.12 mm. In the other embodiments, the solder sheet has a thickness of 0.1 mm.

In an embodiment of the present invention, after arranging a plurality of solder sheets on the surface of the metal mesh, hard-alloy sheets are placed on the surface of each solder sheet. In an embodiment of the present invention, hard-alloy sheets are arranged on the surface of the metal matrix by placing the hard-alloy sheets on the surface of the solder sheets. In the invention, the hard-alloy sheets have abrasion resistance and corrosion resistance, thereby imparting good abrasion resistance to the composite hard-face material prepared by the invention. In embodiments of the present invention, the hard-alloy sheets comprise 6 wt % to 12 wt % of Co, and 88 wt % to 94 wt % of WC. In other embodiments, the hard-alloy sheets comprise 8 wt % to 10 of wt % Co, and 90 wt % to 92 wt % of WC.

Figure 2:
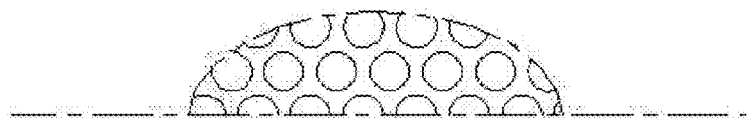
FIG. 2 is a schematic view showing the arrangement mode of circular hard-alloy sheets provided in an embodiment of the present invention.
Figure 3:
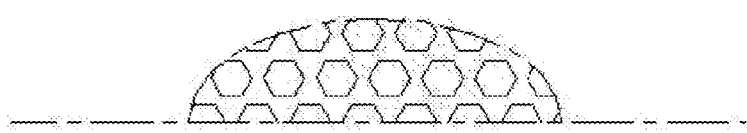
FIG. 3 is a schematic view showing the arrangement mode of regular hexagonal hard-alloy sheets provided in an embodiment of the present invention.

In an embodiment of the present invention, the hard-alloy sheet may be rectangular, circular, oval or regular hexagonal in shape. As shown in FIGS. 1 to 3, FIG. 1 is a schematic view showing the arrangement mode of rectangular hard-alloy sheets provided in an embodiment of the present invention, FIG. 2 is a schematic view showing the arrangement mode of circular hard-alloy sheets provided in an embodiment of the present invention, and FIG. 3 is a schematic view showing the arrangement mode of regular hexagonal hard-alloy sheets provided in an embodiment of the present invention. In an embodiment of the present invention, the malposition arrangement of two adjacent rows of the hard-alloy sheets can allow better spot welding of the hard-alloy sheets and the metal matrix. In an embodiment of the present invention, a distance between two adjacent rows of hard-alloy sheets is 2 mm to 3.5 mm. In an embodiment of the present invention, a distance between two adjacent hard-alloy sheets in each row is 1 mm to 2 mm. In an embodiment of the present invention, the plurality of hard-alloy sheets are dispersed on the surface of the metal matrix so that the coverage of the surface of the metal matrix is more than 40%.

In embodiments of the present invention, the hard-alloy sheet has a thickness of 3 mm to 5 mm. In other embodiments, the hard-alloy sheet has a thickness of 3.5 mm to 4.5 mm. In yet other embodiments, the hard-alloy sheet has a thickness of 3.8 mm to 4.2 mm. In embodiments of the present invention, the hard-alloy sheet has a rectangular or trapezoidal longitudinal section. In other embodiments, the hard-alloy sheet has a trapezoidal longitudinal section, wherein the side of the hard-alloy sheet in contact with the metal matrix has a larger area, and the side away from the metal matrix has a smaller area. The composite hard-face material prepared in this way can expose an increasing area of the hard-alloy sheet due to the continuous abrasion during the use thereof, so it is more abrasion-resistant and prolongs the service life of the composite hard-face material. In an embodiment of the present invention, the gradient angle of the longitudinal section of the hard-alloy sheet is 80° C. to 85° C. In embodiments of the present invention, the hard-alloy sheet has a length A which satisfy $0 < A \leq 15$ mm. In other embodiments, the hard-alloy sheet has a length of 1 mm to 10 mm. In yet other embodiments, the hard-alloy sheet has a length of 3 mm to 6 mm. In embodiments of the present invention, the hard-alloy sheet has a width of 4 mm to 6 mm. In other embodiments, the hard-alloy sheet has a width of 4.5 mm to 5.5 mm. In yet other embodiments, the hard-alloy sheet has a width of 4.8 mm to 5.2 mm.

In an embodiment of the present invention, after the hard-alloy sheets are placed on the surface of each solder sheet, the hard-alloy sheet and the metal matrix are spot welded such that a plurality of hard-alloy sheets are dispersedly fixed on the surface of the metal matrix. In embodiments of the present invention, a current of the spot welding is 700 A to 1000 A. In other embodiments, the current of the spot welding is 750 A to 950 A. In yet other embodiments, the current of the spot welding is 800 A to 850 A.

In an embodiment of the present invention, the metal mesh on the surface of the metal matrix, through its dense pores, firmly locks the soldering fluid of the molten solder sheets to firmly bond the soldering fluid to the hard-alloy sheets, such that the hard-alloy sheets are fixed by spot welding on the metal mesh, and the metal mesh is fixed by welding on the surface of the metal matrix, thereby ensuring that the hard-alloy sheets can be firmly bonded to the surface of the metal matrix without the need of large current, and avoiding generation of cracks in the hard-alloy sheets during spot welding. In addition, during the welding process, a stress will be generated in the hard-alloy sheets, however, the metal mesh can be "loosened" with the hard-alloy sheet to release the stress, thereby further avoiding generation of cracks in the hard-alloy sheets. Therefore, when fixing a plurality of hard-alloy sheets on the surface of the metal matrix using the method provided according to the embodiments of the invention, the composite hard-face material prepared can be provided with good abrasion resistance.

In the invention, after a plurality of hard-alloy sheets are dispersedly fixed on the surface of the metal matrix, the hard-alloy sheets and the metal matrix are subjected to overlay welding using a solder to obtain a composite hard-face material. In an embodiment of the present invention, the solder comprises nickel-based alloy powder, tungsten carbide particles, and boron nitride powder. In the present invention, the nickel-based alloy powder can increase the flowability and corrosion resistance, imparting good abrasion resistance to the composite hard-face material prepared in the present invention. In an embodiment of the present invention, the nickel-based alloy powder is a nickel-based self-fluxing alloy powder. In an embodiment of the present invention, the nickel-based self-fluxing alloy powder comprises 93 to 95 wt % of Ni, 1.5 to 2 wt % of B, and 3.5 to 4 wt % of Si. In an embodiment of the present invention, the content of Ni in the nickel-based self-fluxing alloy powder is 93.5 wt % to 94.5 wt %. In an embodiment of the present invention, the content of B in the nickel-based self-fluxing alloy powder is 1.6 wt % to 1.8 wt %. In an embodiment of the present invention, the content of Si in the nickel-based self-fluxing alloy powder is 3.6 wt % to 3.8 wt %. In embodiments of the present invention, the nickel-based alloy powder has a particle size of 60 mesh to 80 mesh. In other embodiments, the nickel-based alloy powder has a particle size of 65 mesh to 75 mesh. In yet other embodiments, the nickel-based alloy powder has a particle size of 68 mesh to 72 mesh.

In the invention, the tungsten carbide particles can increase the hardness, and improving the abrasion resistance of the composite hard-face material prepared in the present invention. In embodiments of the present invention, the tungsten carbide particles are cast tungsten carbide particles. In other embodiments, the tungsten carbide particles are spherical cast tungsten carbide particles. In an embodiment of the present invention, the cast tungsten carbide particles are co-crystals of WC and $W_2C$. In embodiments of the invention, the cast tungsten carbide particles have a Vickers hardness HV 0.3 of 2300 to 2700. In an embodiment of the present invention, the cast tungsten carbide comprise 3.9 wt % to 4.1 wt % of C, 95.6 wt % to 96 wt % of W, and 0.1 wt % to 0.2 wt % of Fe. In embodiments of the present invention, the tungsten carbide particles have a particle size of 60 mesh to 80 mesh. In other embodiments, the tungsten carbide particles have a particle size of 65 mesh to 75 mesh. In yet other embodiments, the tungsten carbide particles have a particle size of 68 mesh to 72 mesh.

In the invention, the boron nitride powder can effectively reduce the friction coefficient, imparting good abrasion resistance to the composite hard-face material prepared in the invention. In an embodiment of the present invention, the boron nitride powder is hexagonal boron nitride powder. In an embodiment of the present invention, the hexagonal boron nitride powder has a particle size of 70 mesh to 100 mesh.

In embodiments of the present invention, a mass ratio of the nickel-based alloy powder, the tungsten carbide particles and the boron nitride powder is (30-55):(45-70):(0.2-0.5). In other embodiments, the mass ratio of the nickel-based alloy powder, the tungsten carbide particles and the boron nitride powder is (35-50):(50-65):(0.25-0.45). In yet other embodiments, the mass ratio of the nickel-based alloy powder, the tungsten carbide particles and the boron nitride powder is (40-45):(55-60):(0.3-0.4).

In an embodiment of the present invention, the solder can be prepared by mixing the nickel-based alloy powder, the tungsten carbide particles, and the boron nitride powder. In the present invention, the solder consists of nickel-base alloy powder, tungsten carbide particles and boron nitride powder, which solder has good flowability, low friction coefficient, high hardness and good weldability. By using the solder, the composite hard-face material prepared by the invention can be crack-free and has good abrasion resistance in the welding layer.

In an embodiment of the present invention, the overlay welding is plasma overlay welding. In embodiments of the present invention, a welding current in the plasma overlay welding process is 75 A to 85 A. In other embodiments, the welding current in the plasma overlay welding process is 78 A to 82 A. In yet other embodiments, the welding current in the plasma overlay welding process is 80 A. In embodiments of the present invention, a welding voltage in the plasma overlay welding process is 26 V to 30 V. In other embodiments, the welding voltage in the plasma overlay welding process is 27 V to 28 V. In embodiments of the present invention, an ion gas flow rate in the plasma overlay welding process is 1.3 L/min to 1.5 L/min. In other embodiments, the ion gas flow rate in the plasma overlay welding process is 1.35 L/min to 1.45 L/min. In embodiments of the present invention, a powder feeding rate in the plasma overlay welding process is 40 g/min to 50 g/min. In other embodiments, the powder feeding rate in the plasma overlay welding process is 42 g/min to 48 g/min. In yet other embodiments, the powder feeding rate in the plasma overlay welding process is 44 g/min to 46 g/min.

In the invention, after the overlay welding of the hard-alloy sheet and metal matrix by using a solder, the solder and the hard-alloy sheets together form a abrasion-resistant layer, imparting good abrasion resistance to the hard-face material prepared in the invention.

In an embodiment of the present invention, after the overlay welding of the hard metal alloy sheets and the metal matrix, the method further comprises: grinding the resulting overlay welding product to obtain the composite hard-face material. In an embodiment of the present invention, the grinding process is performed using a resin bonded diamond grinding wheel to expose the hard-alloy sheets on the surface of the prepared composite hard-face material and to reach a desired size. Grinding in this way can avoid the problems of cracking and block dropping of the composite hard-face material prepared in the invention caused due to welding stress and grinding vibration, imparting good apparent quality and abrasion resistance to the composite hard-face material prepared in the invention. In an embodiment of the present invention, before grinding with a resin bonded diamond grinding wheel, the grinding wheel may be immersed in an alcoholic cloudy liquid containing $MoS_2$. $MoS_2$ is brought into voids of the grinding wheel as the alcohol penetrates into the voids, and plays a role of lubricating during grinding again. In embodiments of the present invention, the grinding wheel is immersed in the alcoholic cloudy liquid containing $MoS_2$ for a period of 45 hours to 55 hours. In other embodiments, the grinding wheel is immersed in the alcoholic cloudy liquid containing $MoS_2$ for 48 hours to 52 hours.

The invention provides a composite hard-face material prepared by the method according to the technical solution described above, comprising:
a metal matrix; and
a plurality of hard-alloy sheets dispersedly arranged on a surface of the metal matrix by welding via a solder, wherein the solder comprises nickel-based alloy powder, tungsten carbide particles, and boron nitride powder.

In the present invention, the method for preparing above composite hard-face material is consistent with the method for preparing the composite hard-face material according to the technical solutions described above, and will not be repeated here. In the present invention, the types and sources of the metal matrix, the solder and the hard-alloy sheets are the same as those of the metal matrix, the solder, and the hard-alloy sheets in the technical solution described above, and will not be repeated here.

The abrasion resistance property of the composite hard-face material prepared by the method provided according to the present invention was tested according to ASTM G65-04 "Standard Test Method for Measuring Abrasion Using the Dry Sand/Rubber Wheel Apparatus". The experimental results show that the composite hard-face material prepared by the method provided according to the invention has excellent abrasion resistance.

In the following examples of the present invention, the raw materials used are all commercially available, the steel mesh used is 316L-type steel mesh supplied by Shengbang Metal mesh Factory, Anping County, Hebei Province, and the nickel-based self-fluxing powder and cast WC particles are supplied by Great Wall Hard face Company.

Example 1

A steel mesh having a thickness of 0.2 mm and a mesh size of 1 mm was covered on the excircle surface of a cylindrical 42CrMo matrix having a size of mm×190 mm×50 mm, and then bent such that it could completely cover the excircle surface of the 42CrMo matrix.

A mold made of asbestos paper material and having a thickness of 1.5 mm was placed on the surface of the steel mesh in which the shape and arrangement of holes in the mold was as shown in FIG. 1, and the holes in the mold had a length of 13 mm and a width of 5 mm, and then bent to allow its shape to conform to the excircle surface of the 42CrMo matrix.

0.1 mm thick red copper sheets were disposed in each hole in the mold, and 3 mm thick YG10-type rectangular hard-alloy sheets of 13 mm×5 mm (provided by Zhuzhou Sidi Hard Alloy Technology Co., Ltd.) were placed on each red copper sheet, wherein the coverage of the hard-alloy sheets on the excircle surface of the 42CrMo matrix was 45%.

A 700 A spot welding current was used to melt the red copper sheet, and then the hard-alloy sheets and the 42CrMo matrix were subjected to spot welding, such that a plurality of hard-alloy sheets were dispersedly fixed on the excircle surface of the 42CrMo matrix.

30 parts by mass of nickel-based self-fluxing powder, 0.2 part by mass of hexagonal boron nitride powder and 45 parts by mass of cast WC particles were mixed to obtain a solder.

An overlay-welding product was obtained by plasma overlay welding of the hard-alloy sheets and 42CrMo matrix using 3 Kg of the solder, wherein the welding current was 75 A, the welding voltage was 26 V, the ion gas flow rate was 1.3 L/min, and the powder feeding rate was 40 g/min during the overlay welding.

The overlay-welding product was ground using a resin bonded diamond grinding wheel, such that each of the hard-alloy sheets was exposed by grinding to obtain a composite hard-face material, in which the grinding wheel was immersed in an alcoholic cloudy liquid containing $MoS_2$ for 48 h before use.

Figure 4:
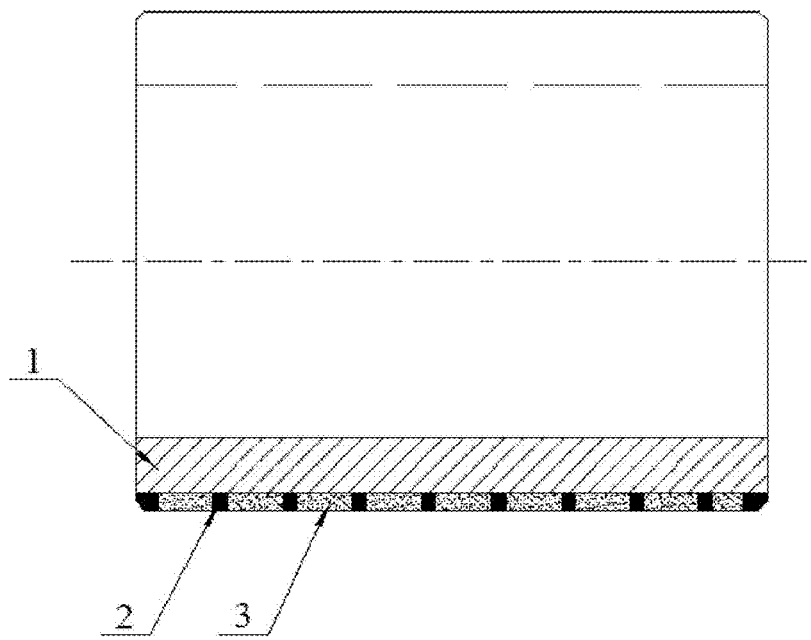
FIG. 4 is a schematic view showing the structure of the composite hard-face material prepared by the method provided in Example 1 of the present invention.
Figure 5:
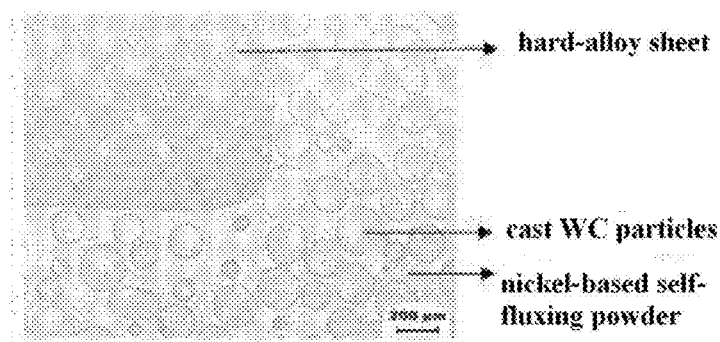
FIG. 5 is a metallographic diagram of the composite hard-face material prepared in Example 1 of the present invention.

The structure of the composite hard-face material prepared in Example 1 of the present invention is shown in FIG. 4, which is a schematic view showing the structure of the composite hard-face material prepared by the method provided according to Example 1 of the present invention, wherein 1 represents 42CrMo matrix, 2 represents hard-alloy sheet, and 3 represents solder. The metallographic observation was conducted on the composite hard-face material prepared in Example 1 of the present invention. The result is shown in FIG. 5, which is a metallographic diagram of the composite hard-face material prepared in Example 1 of the present invention. The hard-alloy sheet, the nickel-based self-fluxing alloy powder, and the cast WC particles can e seen from the figure.

The abrasion resistance of the composite hard-face material prepared in Example 1 of the present invention was tested according to the method described in the above technical solution. For the composite hard-face material prepared in Example 1 of the present invention, the test results are as follows: when the abrasion time is 1 hour, the abrasion weight is 0.0376 g, the density of the hard-face layer is 13.30 g/cm$^3$, the abrasion volume is 0.00282 cm$^3$, and the surface of the composite hard-face material is polished; when the abrasion time is 30 hours, the abrasion amount of diameter is <0.0001 inch, the friction pair is YG10, the abrasion amount of the friction pair is 0.0001 inch, the water temperature is 41° C., and the surface of the composite hard-face material is polished; and when the abrasion time is 50 hours, the abrasion amount of diameter is 0.0001 inch, the friction pair is YG10, the abrasion amount of the friction pair is 0.0002 inch, the water temperature is 40° C., and the surface of the composite hard-face material is polished.

Example 2

A steel mesh having a thickness of 0.2 mm and a mesh size of 1 mm was covered on the inner hole surface of a cylindrical 42CrMo matrix having a size of Φ120 mm×190 mm×50 mm, and then bent such that it could completely cover the inner hole surface of the 42CrMo matrix.

A mold made of asbestos paper material and having a thickness of 1.5 mm was placed on the surface of the steel mesh in which the shape and arrangement of holes in the mold was as shown in FIG. 1, and the holes in the mold had a length of 13 mm and a width of 5 mm, and then bent to allow its shape to conform to the inner hole surface of the 42CrMo matrix.

0.1 mm thick red copper sheets were disposed in each hole in the mold, and 5 mm thick hard-alloy sheets of YG10 type hard-alloy sheets (provided by Zhuzhou Sidi Hard Alloy Technology Co., Ltd.) were placed on each red copper sheet, wherein the cross section of the hard-alloy sheet was a rectangular shape, the longitudinal section of the hard alloy sheet was a trapezoidal shape with a gradient angle of 83°, the maximum dimension of the cross section was 13 mm×5 mm, and the coverage of the hard-alloy sheets on the inner hole surface of the 42CrMo matrix was 50%.

A 800 A spot welding current was used to melt the red copper sheet, and then the hard-alloy sheets and the 42CrMo matrix were subjected to spot welding, such that a plurality of hard-alloy sheets were dispersedly fixed on the inner hole surface of the 42CrMo matrix.

40 parts by mass of nickel-based self-fluxing powder, 0.3 part by mass of hexagonal boron nitride powder and 60 parts by mass of cast WC particles were mixed to obtain a solder.

An overlay-welding product was obtained by plasma overlay welding of the hard-alloy sheets and 42CrMo matrix using 3 Kg of the solder, wherein the welding current was 80 A, the welding voltage was 28 V, the ion gas flow rate was 1.4 L/min, and the powder feeding rate was 45 g/min during the overlay welding.

The overlay-welding product was ground using a resin bonded diamond grinding wheel, such that each of the hard-alloy sheets was exposed by grinding to obtain a composite hard-face material, in which the grinding wheel was immersed in an alcohol for 48 h before use.

Figure 6:
FIG. 6 is a schematic view showing the structure of the composite hard-face material prepared by the method provided in Example 2 of the present invention.

The structure of the composite hard-face material prepared in Example 2 of the present invention is shown in FIG. 6, which is a schematic view showing the structure of the composite hard-face material prepared by the method provided according to Example 2 of the present invention.

The abrasion resistance of the composite hard-face material prepared in Example 2 of the present invention was tested according to the method described in the above technical solution. For the composite hard-face material prepared in Example 2 of the present invention, the test results are as follows: when the abrasion time is 30 hours, the abrasion amount of diameter is 0.0001 inch, the friction pair is YG10, the abrasion amount of the friction pair is 0.00015 inch, the water temperature is 41° C., and the surface of the composite hard-face material is polished; and when the abrasion time is 50 hours, the abrasion amount of diameter is 0.0002 inch, the friction pair is YG10, the abrasion amount of the friction pair is 0.0004 inch, the water temperature is 43° C., and the surface of the composite hard-face material is polished.

Example 3

A steel mesh having a thickness of 0.2 mm and a mesh size of 1 mm was covered on the upper surface (annular plane) of a cylindrical 42CrMo matrix having a size of Φ120 mm×190 mm×50 mm, wherein the annular steel mesh could completely cover the upper surface of the 42CrMo matrix.

An annular mold made of asbestos paper material and having a thickness of 1.5 mm was placed on the surface of the steel mesh in which the shape and arrangement of holes in the mold was as shown in FIG. 1, and the holes in the mold had a length of 13 mm and a width of 5 mm, wherein the shape of the annular mold conformed to the upper surface of the 42CrMo matrix.

0.1 mm thick red copper sheets were disposed in each hole in the mold, and 5 mm thick YG10-type rectangular hard-alloy sheets of 13 mm×5 mm (provided by Zhuzhou Sidi Hard Alloy Technology Co., Ltd.) were placed on each red copper sheet, wherein the coverage of the hard-alloy sheets on the upper surface of the 42CrMo matrix was 58%.

A 1000 A spot welding current was used to melt the red copper sheet, and then the hard-alloy sheets and the 42CrMo matrix were subjected to spot welding, such that a plurality of hard-alloy sheets were dispersedly fixed on the upper surface of the 42CrMo matrix.

55 parts by mass of nickel-based self-fluxing powder, 0.5 part by mass of hexagonal boron nitride powder and 70 parts by mass of cast WC particles were mixed to obtain a solder.

An overlay-welding product was obtained by plasma overlay welding of the hard-alloy sheets and 42CrMo matrix using 3 Kg of the solder, wherein the welding current was 85 A, the welding voltage was 30 V, the ion gas flow rate was 1.5 L/min, and the powder feeding rate was 50 g/min during the overlay welding.

The overlay-welding product was ground using a resin bonded diamond grinding wheel, such that each of the hard-alloy sheets was exposed by grinding to obtain a composite hard-face material, in which the grinding wheel was immersed in an alcohol for 48 h before use.

Figure 7:
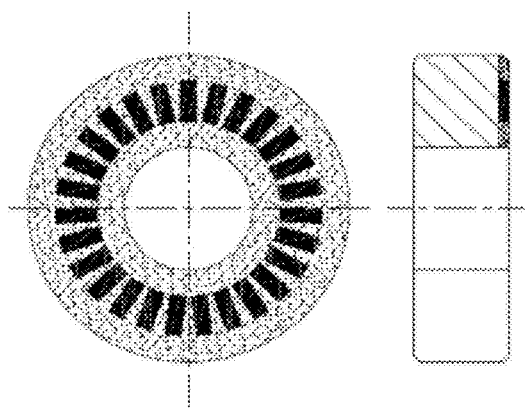
FIG. 7 is a schematic view showing the structure of the composite hard-face material prepared by the method provided in Example 3 of the present invention.

The structure of the composite hard-face material prepared in Example 3 of the present invention is shown in FIG. 7, which is a schematic view showing the structure of the composite hard-face material prepared by the method provided according to Example 3 of the present invention.

Comparative Example 1

KmTBCr20Mo was Used as a Hard-Face Material.

The abrasion resistance of the composite hard-face material provided in Comparative Example 1 of the present invention was tested according to the method described in the above technical solution. For the composite hard-face material provided in Comparative Example 1 of the present invention, the test results are as follows: when the abrasion time is 30 hours, the abrasion amount of diameter is 0.0012 inch, the friction pair is YG10, the abrasion amount of the friction pair is <0.0001 inch, the water temperature is 52° C., and the surface of the composite hard-face material is polished; and when the abrasion time is 50 hours, the abrasion amount of diameter is 0.0027 inch, the friction pair is YG10, the abrasion amount of the friction pair is <0.0001 inch, the water temperature is 51° C., and the surface of the composite hard-face material is polished.

Comparative Example 2

Ni60 from Lanzhou University of Technology was Used as a Hard-Face Material.

The abrasion resistance of the composite hard-face material provided in Comparative Example 2 of the present invention was tested according to the method described in the above technical solution. For the composite hard-face material provided in Comparative Example 2 of the present invention, the test results are as follows: when the abrasion time is 30 hours, the abrasion amount of diameter is 0.0021 inch, the friction pair is YG10, the abrasion amount of the friction pair is <0.0001 inch, the water temperature is 56° C., and the surface of the composite hard-face material is polished; and when the abrasion time is 50 hours, the abrasion amount of diameter is 0.005 inch, the friction pair is YG10, and the surface of the composite hard-face material is polished.

As is apparent from the above examples, the present invention provides a method for preparing a composite hard-face material comprising: dispersedly fixing a plurality of hard-alloy sheets on a surface of a metal matrix; and overlay welding the hard-alloy sheets and the metal matrix using a solder, to obtain the composite hard-face material, wherein the solder comprises nickel-based alloy powder, tungsten carbide particles, and boron nitride powder. The method for preparing a composite hard-face material provided according to the present invention, by dispersedly arranging a plurality of hard-alloy sheets on the surface of the metal matrix, the obtained composite hard-face material can exhibit good abrasion resistance. Moreover, the solder used during the process of preparing a composite hard-face material in the present invention comprises nickel-based alloy powder, tungsten carbide particles, and boron nitride powder, in which the nickel-based alloy powder can increase the flowability and corrosion resistance, the tungsten carbide particles can improve the hardness, and the boron nitride powder can effectively reduce the friction coefficient, thus the solder has good flowability, high hardness and good weldability, and the composite hard-face material prepared using the solder can further improve the abrasion resistance of the composite hard-face material prepared in the invention.

The invention claimed is:

1. A method for preparing a composite hard-face material, comprising:
    dispersedly fixing a plurality of hard-alloy sheets on a surface of a metal matrix; and
    overlay welding the hard-alloy sheets and the metal matrix using a solder, to obtain the composite hard-face material,
    wherein the solder comprises nickel-based alloy powder, tungsten carbide particles, and boron nitride powder.

2. The method according to claim 1, wherein the plurality of hard-alloy sheets are dispersedly fixed on the surface of the metal matrix by spot welding.

3. The method according to claim 2, wherein dispersedly fixing the plurality of hard-alloy sheets on the surface of the metal matrix by spot welding comprises steps of:
    (1) placing a metal mesh on the surface of the metal matrix;
    (2) arranging a plurality of solder sheets on a surface of the metal mesh;
    (3) placing the hard-alloy sheets on a surface of each of the solder sheets; and
    (4) subjecting the hard-alloy sheets and the metal matrix to spot welding, such that the plurality of hard-alloy sheets are dispersedly fixed on the surface of the metal matrix, wherein the spot welding has a current ranging from 700 to 1000 A.

4. The method according to claim 3, wherein arranging the plurality of solder sheets on the surface of the metal mesh comprises:
    placing a mold on the surface of the metal mesh, wherein the mold has a plurality of holes which communicate with the surface of the metal mesh; and
    placing the solder sheets in each hole such that a plurality of solder sheets are arranged on the surface of the metal mesh.

5. The method according to claim 1, wherein a mass ratio of the nickel-based alloy powder, tungsten carbide particles and boron nitride powder is (30-55):(45-70):(0.2-0.5).

6. The method according to claim 1, wherein the overlay welding is plasma overlay welding.

7. The method according to claim 6, wherein a welding current is 75 to 85 A and a welding voltage is 26 to 30V during the overlay welding.

8. The method according to claim 6, wherein an ion gas flow rate is 1.3 to 1.5 L/min and a powder feeding rate is 40 to 50 g/min during the overlay welding.

9. The method according to claim 1, wherein after the overlay welding of the hard metal alloy sheets and the metal matrix, the method further comprises:
    grinding the resulting overlay welding product to obtain the composite hard-face material, wherein the grinding is a grinding process using a resin bonded diamond grinding wheel.

10. A composite hard-face material obtained by the method according to any one of claim 1, comprising:
    a metal matrix; and
    a plurality of hard-alloy sheets dispersedly arranged on a surface of the metal matrix by overlay welding via a solder, wherein the solder comprises nickel-based alloy powder, tungsten carbide particles, and boron nitride powder.

* * * * *